(12) United States Patent
Schulz et al.

(10) Patent No.: US 10,865,891 B2
(45) Date of Patent: Dec. 15, 2020

(54) DEVICE FOR FLOW FORCE COMPENSATION

(71) Applicant: HYDAC FLUIDTECHNIK GMBH, Sulzbach/Saar (DE)

(72) Inventors: Frank Schulz, Blieskastel-Bierbach (DE); Peter Bruck, Althornbach (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 0 days.

(21) Appl. No.: 16/313,537

(22) PCT Filed: Jun. 19, 2017

(86) PCT No.: PCT/EP2017/000707
§ 371 (c)(1),
(2) Date: Dec. 27, 2018

(87) PCT Pub. No.: WO2018/001549
PCT Pub. Date: Jan. 4, 2018

(65) Prior Publication Data
US 2019/0162319 A1 May 30, 2019

(30) Foreign Application Priority Data
Jun. 28, 2016 (DE) .................. 10 2016 007 881

(51) Int. Cl.
*F16K 11/07* (2006.01)
*F16K 31/06* (2006.01)

(52) U.S. Cl.
CPC ...... *F16K 11/0716* (2013.01); *F16K 31/0613* (2013.01); *F16K 31/0686* (2013.01)

(58) Field of Classification Search
CPC ............. F16K 11/0716; F16K 31/0613; F16K 31/0686
See application file for complete search history.

(56) References Cited

U.S. PATENT DOCUMENTS 3,269,416 A 8/1966 Adams
3,945,301 A 3/1976 Buente et al.
(Continued)

FOREIGN PATENT DOCUMENTS

DE 25 13 819 10/1975
DE 27 11 861 9/1978
(Continued)

OTHER PUBLICATIONS

International Search Report (ISR) dated Sep. 11, 2017 in International (PCT) Application No. PCT/EP2017/000707.

*Primary Examiner* — Kevin R Barss
(74) *Attorney, Agent, or Firm* — Wenderoth, Lind & Ponack, L.L.P.

(57) ABSTRACT

A control piston (12) is longitudinally displaceable in a housing (10) having two connection points (P, A) for fluid, and cooperates with a metering edge (34) of the housing (10) at a connection point (P). Point (P), in control positions of the control piston (12), supplies the connection point (A) with fluid via a fluid connection. The piston, as a result of occurring flow forces, tends to be drawn in the direction of a closing position that blocks one of these fluid connections. To compensate the flow force, the control piston (12) has, in the region of the control edge (34) of the housing (10), a shape modification (48) of its cylindrical exterior basic form (50), such that a flow contact surface (52) for fluid is created. The contact surface transfers a compensating force that acts against the flow force to the control piston (12) and that seeks to pull the control piston (12) into an opening position opposed to the closing position.

11 Claims, 2 Drawing Sheets

(56) References Cited

U.S. PATENT DOCUMENTS

| | | | |
|---|---|---|---|
| 4,941,508 A | 7/1990 | Hennessy et al. | |
| 2006/0231147 A1 | 10/2006 | Pride, II et al. | |
| 2009/0057588 A1* | 3/2009 | Reilly | F16K 3/26 |
| | | | 251/129.15 |
| 2015/0000774 A1 | 1/2015 | Sung | |
| 2015/0013808 A1 | 1/2015 | Yamaguchi | |
| 2017/0159832 A1 | 6/2017 | Hilzendegen et al. | |

FOREIGN PATENT DOCUMENTS

| | | |
|---|---|---|
| DE | 40 40 523 | 7/1991 |
| DE | 197 48 841 | 5/1998 |
| DE | 199 38 884 | 2/2001 |
| DE | 10 2006 014 549 | 10/2006 |
| DE | 10 2012 015 356 | 5/2014 |
| DE | 11 2013 000 689 | 10/2014 |
| DE | 10 2014 004 796 | 10/2015 |
| DE | 10 2016 105 203 | 1/2017 |
| EP | 3 118 497 | 1/2017 |

\* cited by examiner

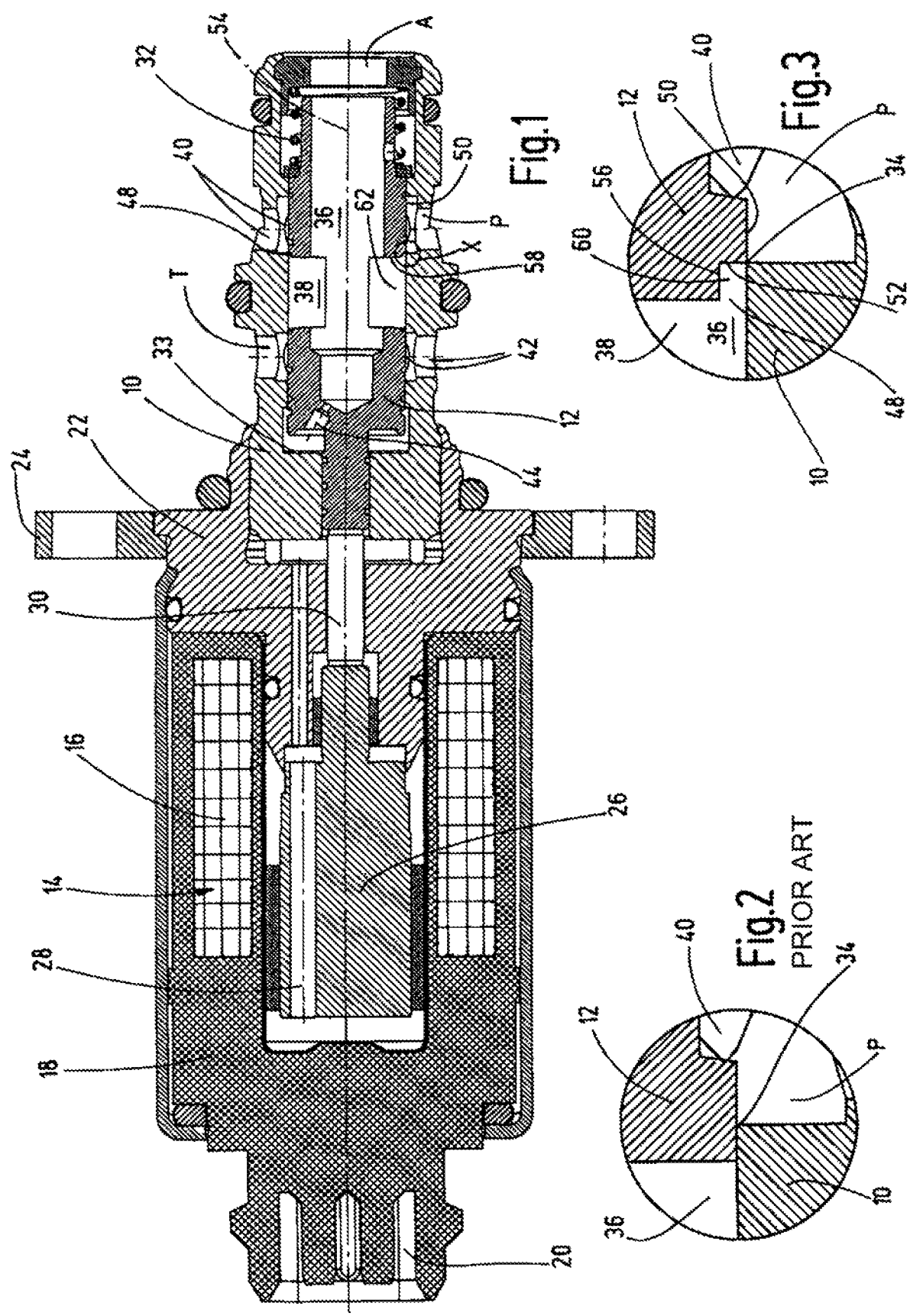

DEVICE FOR FLOW FORCE COMPENSATION

FIELD OF THE INVENTION

The invention relates to a device including at least one regulating piston guided longitudinally movably in a housing having at least two ports for fluid. The piston interacts with a control edge of the housing at a port, which supplies the other port with fluid in regulating positions of the regulating piston via a fluid connection, while tending to pull the piston in the direction of an opening position opposed to a closing position blocking this fluid connection due to occurring flow forces.

BACKGROUND OF THE INVENTION

DE 10 2014 004 796 A1 discloses a proportional pressure regulating valve having a longitudinally movable regulating piston guided in a valve housing. The piston is used to selectively connect ports present in the valve housing, such as a pressure supply port (P),
load port (A) and
tank port or return port (T), by a solenoid operating system. A first characteristic curve is established between a control signal of the solenoid operating system and the flow volume or the actuating pressure (P), in relation to a load, which can be connected to the load port (A). In this known solution, a control device is used to generate a second characteristic curve, which differs from the first characteristic curve, for the load, which can be connected to the load port (A) of the valve housing, after having passed through the first characteristic curve. As a result, a different valve behavior is achieved for pre-definable applications of the known pressure regulating valve, in turn increasing the range of applications for this proportional pressure control valve.

Flow forces act on this regulating process, due to the existing pressures and the volume flows to be managed at the ports, acting on the valve piston or regulating piston of the device. These flow forces are regularly caused by a pressure drop at the assignable control edge or regulating edge in the housing, for example, in the range of a pump supply connection or pressure supply connection (P) for the load port (A). This pressure drop causes a force in the direction of the device connected to the solenoid operating system, which aims at moving the regulating piston in the direction of its closed position, which further reduces the pre-defined pressure.

For certain applications, such as in coupling applications, however, a quick "filling" of the coupling is necessary for their targeted operation, i.e. controlled valves of this type are generally not particularly suitable. This need can be remedied by the use of pilot operated valves (DE 10 2012 015 356 A1). These valves show an increased leakage due to the pilot oil flowing toward the tank or return, resulting in increased power losses. Another option is increasing the magnetic force of the solenoid operating system, which increases the space requirement and results in increased costs both in the production and in the operation of the valve.

SUMMARY OF THE INVENTION

Based on this prior art, the present invention addresses the problem of providing an improved device that is particularly suitable to be used in pressure regulating proportional valves, that does not have the disadvantages described above, that can be produced and operated inexpensively and that is of compact design.

Because, according to the invention, the regulating piston changes its shape from its basic outer cylindrical shape in the area of the control edge of the housing, for a flow force compensation such that an effective flow surface for fluid is created, which flow surface causes a compensating force on the regulating piston against the flow force. This flow force tends to pull the regulating piston into an open position, opposite to the blocking position. A counterforce to the flow force is generated in the operation of the device according to the force formula $F=P\times A$.

As the control edge or regulating edge is "shifted" and the fluid pressure on the change in shape in the form of a circular ring on the regulating piston as a compensation surface regularly remains constant, the flow force still acts in the direction of the solenoid operating system. At the same time, the newly generated counterforce acts as flow force compensation on the regulating piston via the surface or change in shape in the direction of one of the ports in the housing, in particular in the form of a load port. In this way it is possible to reduce the flow forces occurring during the operation of the device or the valve in a structurally simple and cost-effective manner. Advantageously, in the device according to the invention, the inlet pressure is used to compensate the flow force. The pressure level occurring there is generally higher than that on the return side of the device, such that larger volume flows can be more easily managed in a regulating manner. Advantageously, the fluid flowing through the device is deflected by 90° in the area of the control edge or regulating edge and the change in shape in the regulating piston such that the fluid impulse occurring can rest against the whole area of the change in shape or the compensating surface then created.

If the device according to the invention is used in an advantageous manner for a directly controlled valve, the flow force compensation produced in this way permits the use of smaller solenoid operating systems, which regularly show an improved, prompt actuation behavior.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are schematic and not to scale:

FIG. 1 is a side view in section through the essential components of a 3-way pressure control proportional valve according to an exemplary embodiment of the invention;

FIGS. 2 and 3 are partial side views in section of a device known in the prior art and the compensation device according to an exemplary embodiment of the invention, respectively, in an enlarged view of a circular image detail denoted by X in FIG. 1.

DETAILED DESCRIPTION OF THE INVENTION

Figure 4:
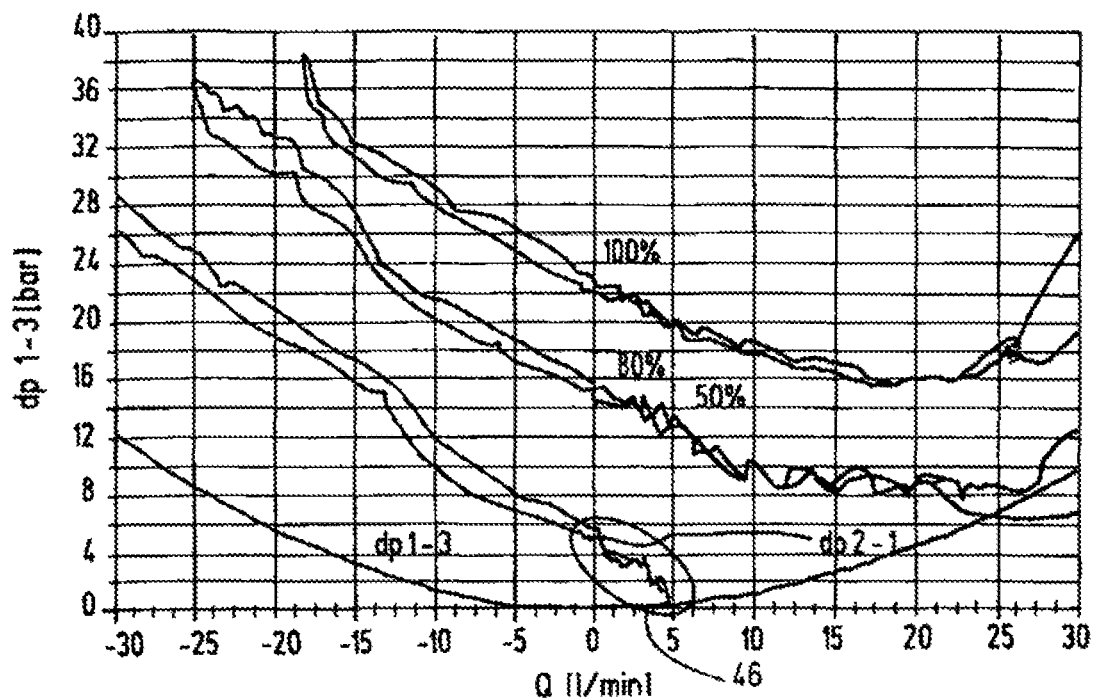
FIGS. 4 and 5 are graphs of pressure regulating characteristics of the prior art and the characteristics achieved using the device for flow force compensation or force control according to the invention, respectively.

FIG. 1 shows a longitudinal section of a 3-way proportional pressure control valve having a longitudinally movable regulating piston 12 guided in a valve housing 10. The piston 12 is used to selectively connect ports, such as a pressure supply or pump port P, a load or user port A, and a tank port or return port T, present in the valve housing 10, by an operating system 14. The operating system 14 shown in FIG. 1 is formed like a solenoid, although operation by a pneumatic or other fluidic actuator (not shown) would also be feasible. Also, a mechanical operating system for the regulating piston 12 is not excluded in principle.

The solenoid 14 has a coil winding 16 in a coil body 18 as customary, and therefore, not described in greater detail. The coil winding 16 of the operating coil can be supplied with a control current via a connector part 20. In the direction of the valve housing 10, the coil body 18 adjoins a pole plate 22. The free end face of pole plate 22 is encompassed by a flange plate 24 for mounting the pressure regulating valve to a valve block (not shown). In that way the pressure regulating valve shown in FIG. 1 can be mounted in the valve block (not shown) in the manner of a cartridge insert or in the manner of an insert cartridge, which valve block has matching connection geometries, which may be brought into fluid-conducting alignment with the ports P, A and T in the valve housing 10. The valve shown does not have a 100% pole tube. The control edge is formed onto the anchor plate 22. Furthermore, there is a separate sleeve, which seals the fluid chamber.

A magnet armature 26 has a pressure equalization channel 28 and is guided longitudinally movably in the coil body 18 to allow an obstacle-free reciprocating motion of the armature 26 in the solenoid in a pressure-balanced manner. Viewed in the direction of FIG. 1, the cylindrical magnet armature 26 has an operating rod 30 on its right free end side, which rod permanently rests against the regulating piston 12. For this purpose, the right end of the regulating piston 12, viewed in the direction of FIG. 1, is held in permanent contact with the operating rod 30 by an energy store in the form of a compression spring 32. The compression spring 32 aims to bring or biases the regulating piston 12 in a left stop position against a stop 33 at the left inside of the valve housing 10.

In the displacement position of the regulating piston 12 shown in FIG. 1, the piston 12 controls a control edge or regulating edge 34 of the valve housing 10 and regulates the feasible fluid flow from port P to port A via the fluid chamber 36 of the regulating piston 12 designed as a hollow piston. If the solenoid is 14 energized further, the regulating piston 12 moves further to the right in the direction shown in FIG. 1 against the action of the compression spring 32, and the opening or regulating cross section at the control edge or regulating edge 34 mentioned is opened further, such that fluid volume from the pressure supply port or pump terminal P increasingly flows to the load port A. That flow is introduced into the front side of the valve housing 10 and has a permanently fluid-conveying connection to the fluid chamber 36 of the regulating piston 12. If the solenoid 14 remains de-energized, the compression spring 32 shifts the arrangement of regulating piston 12, operating rod 30 and magnet armature 26, as viewed in the direction of FIG. 1, to the left, at most until the regulating piston 12 comes into contact with the stop 33 of the valve housing 10.

In the pertinent position of the regulating piston 12, the load port A is connected to the tank or return port T via a groove 38 in the regulating piston 12 in a fluid-conveying manner. This groove 38 is permanently connected to the fluid chamber 36 in a fluid-conveying manner. The axial length of groove 38 is smaller than the length of the inner wall area of the valve housing 10 between the port P and the port T. In this position, the pressure supply port P is disconnected from the load port A because the regulating piston 12 has passed over the control edge or regulating edge 34. This displacement position is apparent from FIG. 2 in the prior art. To form the pressure supply port or pump port P and the tank port or return port T, rows of drilled holes 40 and 42 are introduced into the valve housing in a conventional manner. FIGS. 2 and 3 show a part of a drilled hole of the row of drilled holes 40. To permit the regulating piston 12 to move without obstruction in the valve housing 10, a throttle channel 44 is introduced at the left end side, which extends between the interior of the valve housing 10 having the stop 33 and the fluid chamber 36 in the interior of the hollow-bore regulating piston 12 through the piston end wall.

In the de-energized state, the pressure supply or pump port P is closed and the load port A is connected to the tank port or return port T. If a current signal is then applied to the coil winding 16 of the solenoid 14 via the connector part 20, the solenoid 14 presses on the regulating piston 12 in the direction of the load connection A with a force corresponding to the magnitude of the control current. As a result, the regulating piston 12 is moved to the right against the return spring 32, and the fluid (oil) flows from the pressure supply port or pump port P to the load port A. Depending on the type of load, not shown, for example in the form of a motor vehicle clutch, a counter pressure then builds up at the load port A. That counter force acts on the surface of the regulating piston at the valve and generates a counterforce to the magnetic force of the solenoid, which moves the regulating piston 12 back into the opposite direction of control. In this way, the inflow from the pressure supply or pump connection P to the load port A is reduced until the pressure applied to the load port A corresponds to the magnetic force and thus to the pressure value specification based on the current signal.

If the load now no longer requires pressurized fluid, as is the case when the clutch is at the stop, the cylindrical regulating piston 12 moves further back and closes the drilled inlet holes 40 of the pressure supply or pump port P as shown in the prior art FIG. 2 and interrupts the fluid supply to the load port A to that extent. If the output pressure drops below the setpoint pressure due to the depressurization of the connected load, the armature 26 uses the operating rod 30 to push the regulating piston 12 back towards the right and the control process restarts. The magnetic force of the solenoid 14 defines the maximum attainable regulating pressure. If the pressure at the load port A rises above the preset value, the magnet armature 26 pushes the regulating piston 12 to the left viewed in the direction of FIG. 1 and opens the connections from the load port A to the return port or tank port T. In this way, the pressure at the load port A is limited.

Owing to pressure flow and volume flow acting on the regulating piston 12, flow forces also act on this regulating process. These flow forces cause a pressure drop at the control edge or regulating edge 34 (cf. FIG. 2). This pressure drop creates a force in the direction of the solenoid 14. The regulating piston 12 is then moved in the direction of its closed position, i.e. to the left viewed in the direction of FIG. 1. The pre-defined pressure is then further reduced because the known valve solution according to FIG. 2 moves into its closed position. The resultant characteristic can be seen in FIG. 4 detailing the prior art. The characteristic field framed by an ellipse 46 for emphasis shows how the known pressure regulator behaves with increasing volume flow. If, for example, the volume flow is increased to 5 l per minute at 4 bar, the pressure drops to zero bar. Because, as mentioned, in coupling applications for the valve above, the coupling has to be "filled" quickly, this known valve would not be suitable for such an application, as the closing behavior of the valve specifically prevents the rapid filling of the coupling.

Figure 5:
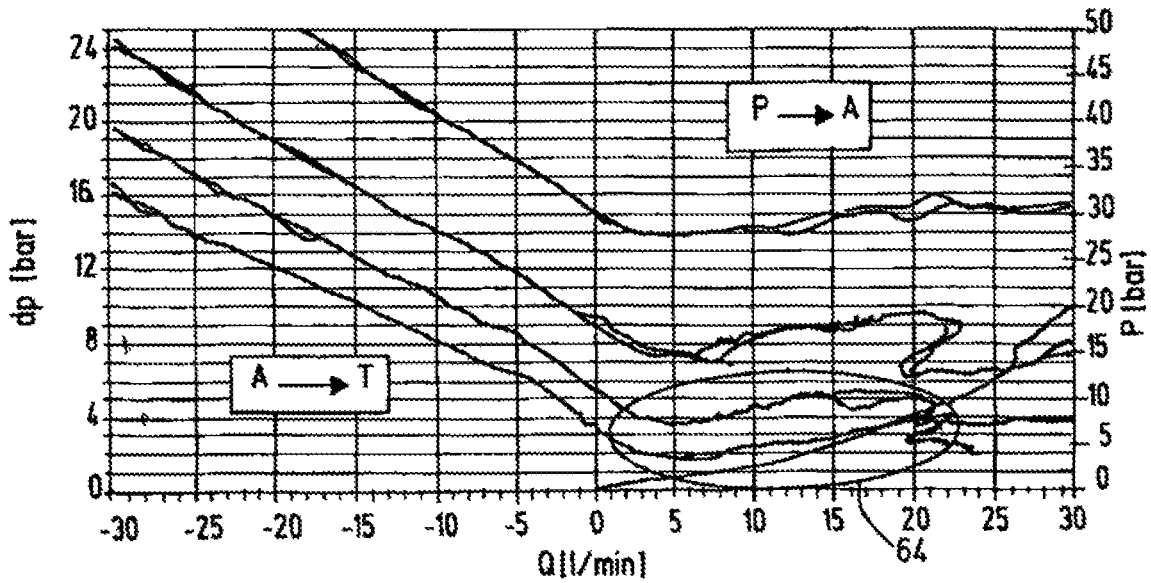

This situation is where the invention comes in, which generates a counterforce to the flow force due to its structural design, which will be explained in more detail below, in particular with reference to the illustration of FIG. 3 and FIG. 5.

As is apparent in particular from the illustration according to FIG. 3, the regulating piston 12 shows a change in shape 48 from its cylindrical outer basic shape 50 for a flow force compensation in the region of the control edge or regulating edge 34 of the housing 10. Due to this change in shape 48, an effective flow surface 52 for fluid is provided, which causes a compensating force on the regulating piston 12 counteracting the flow force. This compensating force aims at pulling or tends to pull the regulating piston 12 into an open position opposite to the locked position. As viewed in the direction of FIG. 1, the pulling is from the left to the right. The effective flow surface 52 is perpendicular to the longitudinal or travel axis 54 of the regulating piston 12 and can be moved conjointly with the latter.

The change in shape 48 is in particular a discontinuity in diameter, preferably of an offset 56 in the regulating piston 12. The offset 56 is set back from a free end face 58 of the regulating piston 12 in the region of its groove 38 away from the groove 38 in the direction of the port A. The effective flow surface 52 forms an annular surface and is arranged in abutment with the control edge or regulating edge 34 in a regulating position of the housing 19 or in its extension. The fluid connection between the two ports P, A is then actuated.

The change in shape 48 in the regulating piston 12 forms an annular fluid control chamber 60, which during regulating operation is subject to a lower fluid pressure on the return side 62 of the device than the pressure present at the port P in the valve housing 10. These respective pressures to be actuated are greater than the tank pressure or the ambient pressure.

As can be further seen from the illustration according to FIG. 3, when the fluid cross section is opened, i.e. when the regulating piston 12 is moving to the right, a fluid diversion of approximately 90° is effected in operation such that the resulting impulse can rest against the entire effective flow surface 52 in the direction of the terminal A. The change in shape 48 is then exposed to a constant fluid pressure during the regulating process.

According to the invention, the discontinuity in diameter in the form of the step 56 is formed by two different diameters in the regulating piston 12. The smaller diameter opens into the recess or channel 38 in the regulating piston 12 mentioned above.

To compensate for the flow force by a counterforce, a surface 52 has been added to the regulating piston 12, below the control edge or regulating edge 34. In this arrangement, the input pressure at the pump port or pressure supply port P can be used to compensate for the flow force. The surface 52 at the port P can be used to generate the counterforce to the flow force according to the force formula F=P×A. Because the control edge or regulating edge 34 is "shifted" in this way while the pressure on the annulus 52 remains constant, the flow force continues to act in the direction of the solenoid 14. The newly generated counterforce acts via the surface 52 at the regulating piston 12 in the direction of load port A, however. Thus, while the flow force tries to pull the regulating piston 12 in a closed position, the counterforce generated counteracts by moving or pulling the regulating piston 12 to an opening position. The associated horizontal pressure characteristic curve is reproduced in FIG. 5 for a range, which is bordered by an ellipse 64 for clarification. This arrangement results in a largely harmonious filling behavior for a load connected to the load port A, such as a motor vehicle clutch.

The device according to the invention does not need to be limited to applications using direct-controlled compact pressure regulators, such as the proposed valve. Such flow force management in the way of compensation can also be easily implemented using slide valves. Furthermore, two ports, which are to be connected to each other in a fluid-conveying manner in a regulating manner, are sufficient to be able to perform the flow-force compensation in the frame outlined. In that regard, the device according to the invention can basically be applied anywhere where ports are to be connected to each other and separated again in a regulatory manner in a fluid-conveying manner via a regulating piston. In particular, by using the flow force compensation according to the invention, solenoids can be built more compactly, which improves the actuation behavior and helps to save costs and installation space. This structure of the invention is without parallel in the prior art.

While one embodiment has been chosen to illustrate the invention, it will be understood by those skilled in the art that various changes and modifications can be made therein without departing from the scope of the invention as defined in the claims.

The invention claimed is:

1. A device, comprising:
a housing having a longitudinal axis, a pressure supply port, a user port and a tank port therein, said pressure port being connectable to a pressure supply source, said tank port being connectable to a pressure sink; and
a regulating piston being movably guided longitudinally in said housing and controlling fluid conducting connections of said user port to said pressure supply port and to said tank port in regulating positions of said regulating piston in said housing, fluid pressure on said regulating piston generating a closing force tending to move said regulating piston toward a closed regulating position of said regulating positions closing said pressure supply port when said pressure supply port is in fluid communication with said user port, said regulating piston being hollow and having an outer surface that is cylindrical except for a recess in said outer surface extending in an axial direction of said regulating piston for a distance less than an axial distance between said pressure supply port and said tank port along said longitudinal axis, said recess having an effective flow surface providing a flow force compensation causing a compensating force acting in opposition to the closing force on said regulating piston tending to move said regulating piston toward an open regulating position of said regulating positions opening said pressure supply port when said pressure supply port is in fluid communication with said effective flow surface.

2. A device according to claim 1 wherein
a magnet armature of a solenoid coupled to said housing moves said regulating piston in said housing between said regulating positions toward the open regulating position against an energy storage, said energy storage biasing said regulating piston toward the closed regulating position; and when the closing force builds up on said regulating piston at said user port and acts in opposition to a solenoid force applied to said regulating piston by said magnet armature, said regulating piston is movable back in an opposite direction in which the fluid pressure from said pressure supply port to said user port until the fluid pressure applied to the user port corresponds to the solenoid force and to a pressure value specification of a current signal of said solenoid.

3. A device according to claim 2 wherein
said regulating piston is movable against a stop in said housing in a de-energized state of said solenoid, placing said tank port and said user port in fluid communication and blocking fluid communication between said user port and said pressure supply port by said regulating piston.

4. A device according to claim 1 wherein
said recess forms an annular fluid control chamber subjected to a lower fluid pressure on a return side of the device than the fluid pressure at the pressure supply port in said housing, with the pressures being actuated being greater than pressure at said tank port during a regulating operation.

5. A device according to claim 1 wherein
a control edge of said pressure supply port and said recess of said regulating piston forms a 90° fluid bypass in operation such that a resulting pressure pulse is applied against an entirety of said effective flow surface and such that said recess is subjected to a constant fluid pressure.

6. A device according to claim 1 wherein
said regulating piston in said recess has a smaller diameter than other portions of said outer surface of said regulating piston.

7. A device according to claim 1 wherein
when a larger diameter portion of said recess is in annular contact with a control edge of said pressure supply port, a smaller diameter portion of said recess is radially spaced from an inner surface of said housing and is disconnected with said pressure supply port and said tank port.

8. A device according to claim 1 wherein
said housing and said regulating piston form a 3-way pressure control proportional valve.

9. A device according to claim 1 wherein
a magnet armature of said solenoid coupled to said housing moves said regulating piston in said housing between the regulating positions.

10. A device according to claim 1 wherein
said pressure supply port and said tank port extend radially in said housing relative to said longitudinal axis of said housing; and
said user port extends axially into said housing along said longitudinal axis.

11. A device according to claim 1 wherein
said recess is at pockets extending through said regulating piston.

* * * * *